United States Patent [19]

Kosker

[11] Patent Number: 5,090,280
[45] Date of Patent: Feb. 25, 1992

[54] TOOL HOLDER ASSEMBLY WITH ANGULAR ADJUSTMENT MECHANISM

[75] Inventor: Leon G. Kosker, Raleigh, N.C.
[73] Assignee: Kennametal Inc., Latrobe, Pa.
[21] Appl. No.: 497,050
[22] Filed: Mar. 21, 1990
[51] Int. Cl.$^5$ ............................................. B23B 29/00
[52] U.S. Cl. .................................................... 82/158
[58] Field of Search ..................... 82/158, 160, 161; 408/181, 153

[56] References Cited

U.S. PATENT DOCUMENTS

| | | |
|---|---|---|
| 3,125,798 | 3/1964 | Stein . |
| 4,292,865 | 10/1981 | Liu et al. . |
| 4,417,489 | 11/1983 | Liu . |
| 4,428,704 | 1/1984 | Kalokhe . |
| 4,631,994 | 12/1986 | Jester et al. . |
| 4,632,614 | 12/1986 | Rall et al. ........................ 82/161 |
| 4,736,659 | 4/1988 | Erickson ......................... 82/158 |
| 4,773,801 | 9/1988 | Noggle . |
| 4,932,295 | 6/1990 | Erickson ......................... 82/158 |

Primary Examiner—Bruce M. Kisliuk
Assistant Examiner—Lawrence Cruz
Attorney, Agent, or Firm—James G. Porcelli; Thomas R. Trempus

[57] ABSTRACT

In the present invention, a tool holder assembly is provided with a mechanism for adjusting the angular orientation of the tool holder with respect to the longitudinal axis of the tool holder. A tool mounting sleeve adapted to receive and hold a standard tool holder is rotatably mounted to a tool block. A shaft extends from the rear of the sleeve and projects from the tool block. A pivot arm is fixedly secured at one end to the shaft and is pivotally secured at its other end to an adjustment block. The adjustment block moves linearly along an adjustment rod which is fixed to the tool block. Means are provided for securing the adjustment block at any position along the adjustment rod. The mounting sleeve, and thus the tool holder, can be rotated by repositioning the adjustment block along the adjustment rod.

15 Claims, 4 Drawing Sheets

TOOL HOLDER ASSEMBLY WITH ANGULAR ADJUSTMENT MECHANISM

FIELD OF THE INVENTION

The present invention relates generally to machine tools for performing metal cutting operations, and more particularly, adjustment mechanisms for machine tools to adjust angular orientation of the cutting insert.

BACKGROUND OF THE INVENTION

In the process of machining helixes for worm gears, a cutting tool having two cutting edges is used. Both of the cutting edges engage the work simultaneously to form the helix. Because the leading cutting edge is moving into the helix, sufficient clearance must be provided so that the side flank adjacent the leading edge does not drag or rub on the helix being formed. Thus, it is usual for the cutting edge angle of the leading edge to be more acute than cutting edge angle of the tailing edge which is moving away from the helix. The acuteness of the leading cutting edge angle means that the leading cutting edge will have less support than the trailing cutting edge.

On the other hand, the leading cutting edge will have a positive cutting rake angle, while the trailing edge has a negative cutting rake angle. The positive cutting rake on the leading edge means that there will be less tool pressure on the leading cutting edge than on the trailing cutting edge. The greater tool pressure on the trailing edge will cause it to wear faster than the leading edge resulting in premature tool failure. Further, the uneven tool pressure might cause some deflection of the tool thereby effecting the accuracy of the final workpiece.

Another drawback associated with prior art tools results from the tool having a fixed geometry. Since a different tool geometry is preferred for different helixes, it is necessary to keep on hand a relatively large number of different tools. Further, the machine must be shut down each time a new job is started so that the tool can be changed.

SUMMARY AND OBJECTS OF THE INVENTION

The present invention is a tool holder assembly having an adjustment mechanism to enable the tool holder to be rotated about its own longitudinal axis. By rotating the tool holder in this manner, the geometry of the cutting tool with respect to the workpiece can be varied. The variability of the geometry of the cutting tool means that a single tool can be used to cut a variety of different parts.

More importantly, the geometry of the cutting tool can be optimized for the particular cutting operation. For instance, in a tool having a fixed cutting edge angle, side clearance can be obtained simply by rotating the tool about the longitudinal axis of the tool holder. The ability to rotate the tool means that the cutting tool can be designed with a greater cutting edge angle, and thus greater support, on the leading edge as compared to prior art tools. Further, by rotating the cutting too about the longitudinal axis of the tool holder, the difference between the side rake angles on the leading edge and trailing edge can be minimized thereby distributing tool pressures more evenly.

In the preferred embodiment of the invention, a rotatable mounting sleeve is mounted within a bore of a tool block. The mounting sleeve defines a tool receiving cavity adapted to receive and hold the tool holder. Clamping means are provided for holding the tool holder non-rotatable with respect to the mounting sleeve. A shaft extends from the back of the mounting sleeve through the tool block. An adjustment mechanism is mounted on the back of the tool block and engages the shaft to rotate the mounting sleeve.

Preferably, the adjustment mechanism includes an adjustment rod pivotally secured at one end to the tool block, an adjustment block mounted on the adjustment rod and movable linearly on the rod, and a pivot arm fixedly secured at one to the shaft of the mounting sleeve and pivotally secured at the opposite end to the adjustment block. To change the angular orientation of the tool holder, the adjustment block is moved linearly along the adjustment rod. The linear movement of the adjustment block is translated by the pivot arm into rotational movement of the mounting sleeve.

From the foregoing, it is apparent that the primary object of the present invention is to provide a more versatile tool which can be used to machine a plurality of different parts.

Another object of the present invention is to provide an adjustable holder for a cutting tool so that tool geometry can be varied to improve tool performance.

Another object of the present invention is to provide a adjustable holder for a cutting tool where it s possible to make small adjustments in the angular orientation of the cutting tool.

Other objects and advantages of the present invention will become apparent and obvious from a study of the following description and the accompanying drawings which are merely illustrative of such invention.

DETAILED DESCRIPTION OF THE INVENTION

Figure 1:
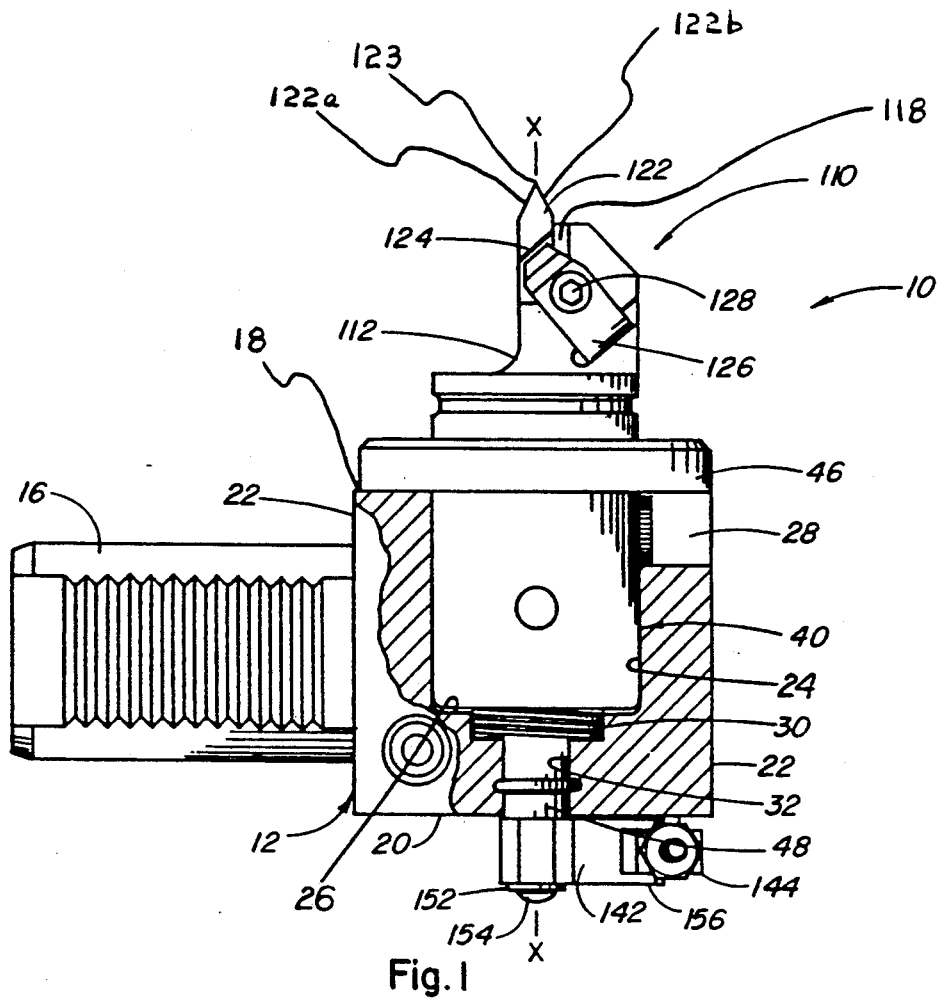
FIG. 1 is an elevation view of the tool holder assembly of the present invention with a portion of the tool block removed to illustrate the tool mounting sleeve.

Referring now to the drawings, and particularly to FIG. 1, the tool assembly of the present invention is shown therein and indicated generally by the numeral 10. The tool assembly 10 includes a tool block 12, tool mounting sleeve 40, tool holder 110, and adjustment mechanism. The toolblock 12 includes a block portion having a front face 18, rear face 20, and four side faces 22. A shank 16 extends from one of the side faces 22. A large bore 24 extends from the front face 18 towards the rear face 20. A channel 28 is also formed in the front face 18 and extends perpendicularly from the large bore 24 to the side face 22 which is opposite shank 16. A smaller bore 32 extends from the bottom 26 of the larger bore 24 to the rear face 20 of the tool block 12. A recess 30 s also formed n the bottom 26 of the larger bore 24 for housing a spring washer.

On the front face, are a plurality of bolt holes (not shown) spaced at 60° intervals. A series of degree markings 36 are also etched onto the front face along one side of the larger bore 24.

A sleeve 40 is rotatably mounted to the tool block 12. The sleeve 40 includes a cylindrical side wall 42, a bottom 44 and an open top defining a tool receiving cavity. An outwardly extending flange 46 projects from the upper end of the sleeve 40. A shaft 48 extends rearwardly from the bottom 44 of sleeve 40.

The sleeve 40 is adapted to fit within the larger bore 24 of tool block 12 while the shaft 48 extends through the smaller bore 32. The shaft is long enough to extend beyond the rear face 20 of the tool block 12 when the flange 46 seats against the front face 18. The sleeve 40 is secured to the tool block 12 by bolts 50. Bolts 50 pass through slots 52 formed in the flange 46 of the sleeve 40 and are threaded into corresponding bolt holes (not shown) in the front face 18.

A releasable locking mechanism 60 is securely held inside of sleeve 40. The locking mechanism 60 includes a ball canister 64 which is held by a dowel pin 62 which is engaged in coaxially aligned mounting holes in the ball canister 64 and sleeve 40. The ball canister 64 includes two transverse passages 66 and 68 which extend perpendicularly to the longitudinal axis x-x. A bump-off pin 70 is loosely mounted in a longitudinal bore 72 and retained there by a second pin member 74. The ends of the pin 74 are firmly embedded in the walls of the ball canister 64 and s loosely engaged n a transverse opening 76 in the bump-off pin 70. The loose fitting between pin 74 and transverse opening 76 allows for some movement of the bump-off pin 70.

Loosely, but non-rotatably engaged within transverse passage 66 is a actuating member which includes a head portion 82 and shank portion 84. The shank portion 84 is formed with threads 86. A torque screw 88 connects the actuating member 80 to the sleeve 40 while also providing means for reciprocally moving the actuating member 80.

The torque screw 88 includes an internally threaded portion 90 which engages threads 86 on the shank portion 84 of actuating member 80. The torque screw 88 also has an externally threaded portion 92 which is threaded oppositely to the threads on the internal portion 90. The externally threaded portion 92 engages a threaded opening 94 in the side wall of the sleeve 40. On the end of the torque screw 88 accessible from the exterior of the sleeve 40 is a hexagonal depression 96 adapted to be engaged by an allen wrench.

The head portion 82 of the actuating member includes a pair of ball driving ramps 98 on opposite sides thereof. The ball driving ramps 98 are adapted to engage locking balls 100 which are loosely held in the transverse passage 68. The ramps decline inwardly as they extend away from the shank portion 84 until they join concave spherical depressions 102. The actuating member 80 also includes an inclined surface 104 adapted to engage a corresponding surface 106 on the bottom of the bump off pin 70.

Figure 3:
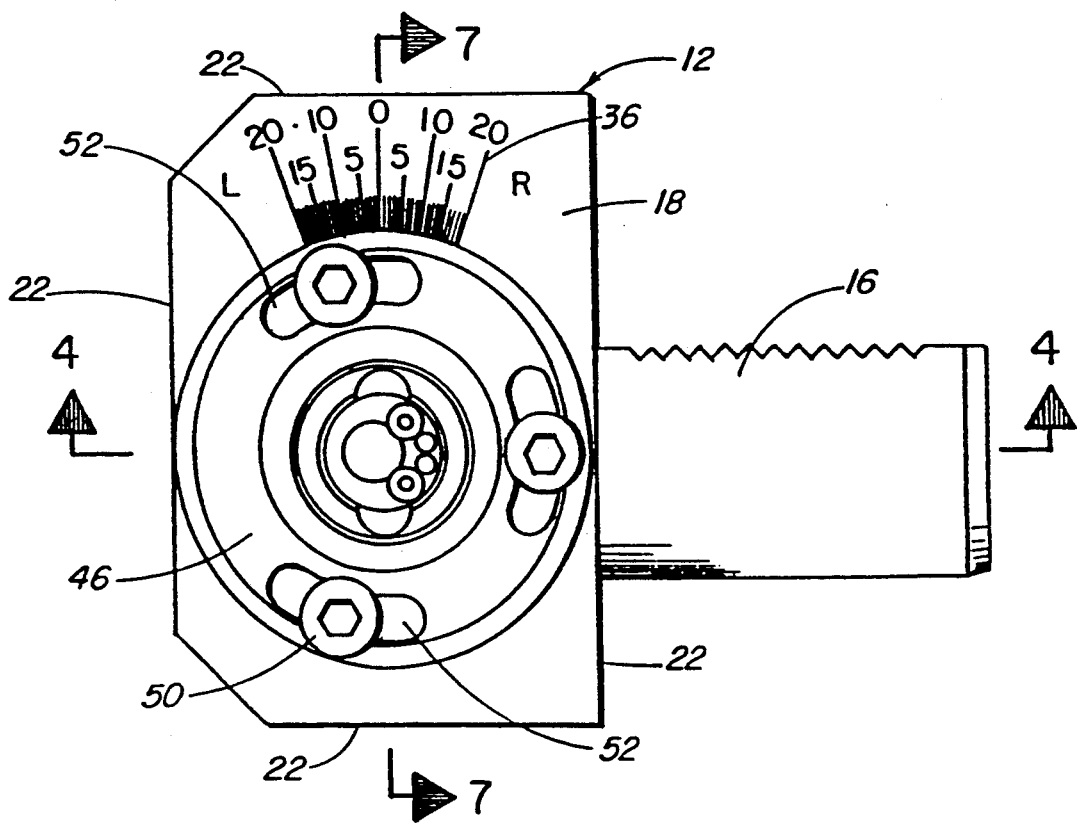
FIG. 3 is a top plan view of the tool holder assembly with the tool holder removed therefrom.
Figure 4:
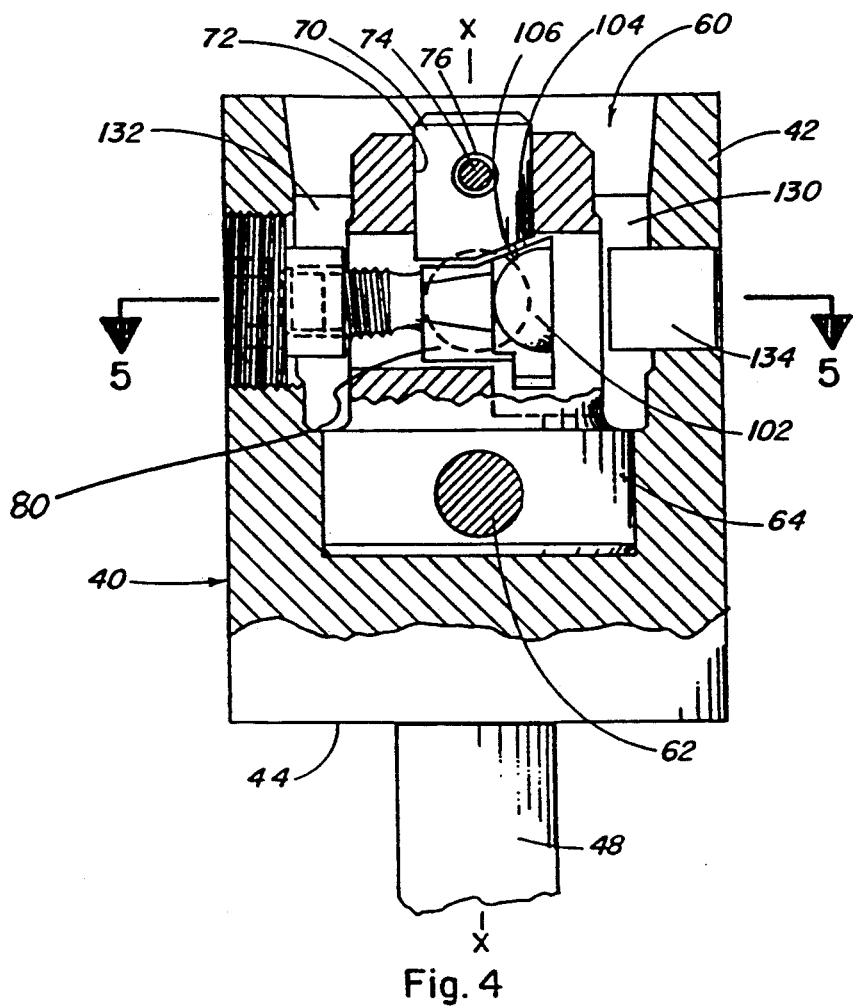
FIG. 4 is a section view of the mounting sleeve taken through line 4—4 of FIG. 3.
Figure 5:
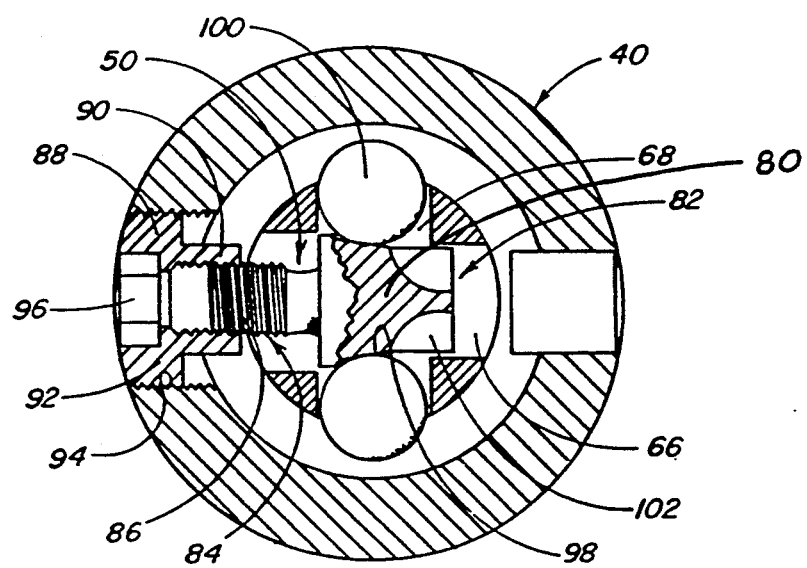
FIG. 5 is a section view taken through line 5—5 of FIG. 4.

It will be readily apparent from the foregoing description that when the torque screw 88 is turned in a first direction, the actuating member 80 will be moved to roll locking elements 100 out of spherical depressions 102 and onto the ball driving ramps 98. The locking balls 100 are thus driven outwardly as best shown in FIGS. 3 and 5. When the torque screw 88 is rotated in a second direction, the actuating member 80 is moved in a second direction to allow the locking balls 100 to roll back into the spherical depressions 102. At the same time, the inclined surface 104 engages the corresponding inclined surface 106 of the bump-off pin 70 to push it upward. The bump-off pin 70, in turn, pushes upwardly against the tool holder 110 to break the tool holder free from the sleeve 40.

Figure 6:
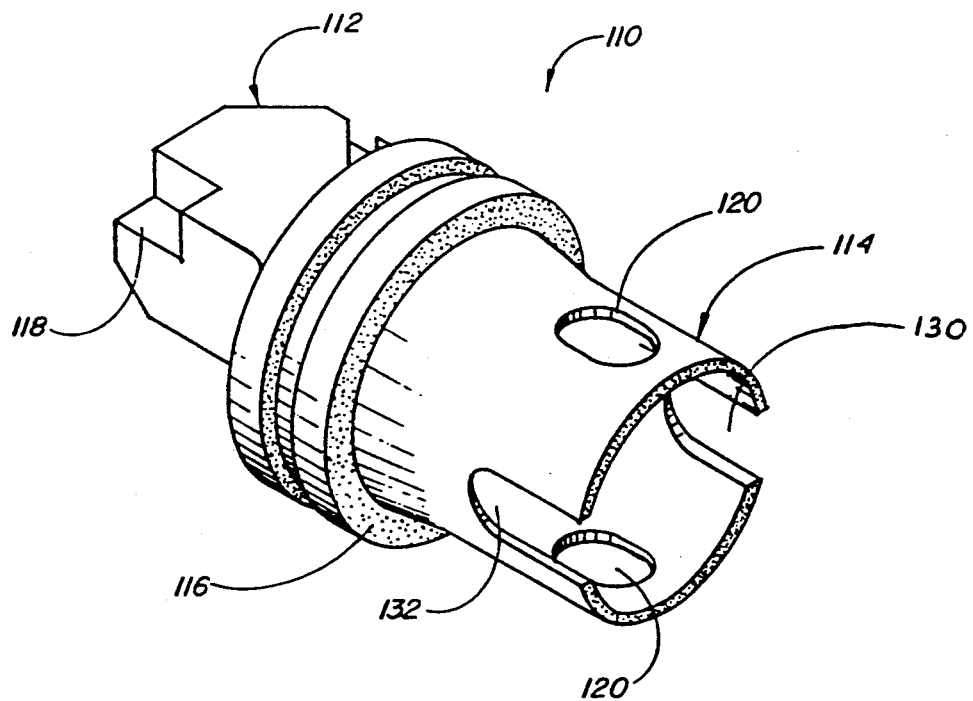
FIG. 6 is a perspective view of the tool holder adapted for use in connection with the present invention.
Figure 7:
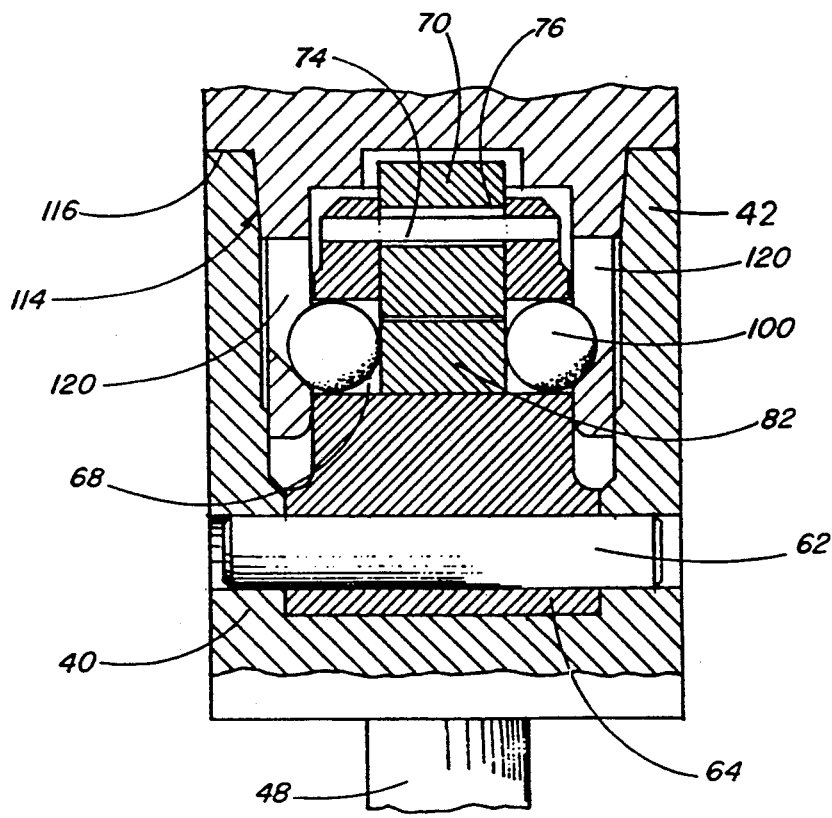
FIG. 7 is a section view of the mounting sleeve and tool holder taken through line 7—7 of FIG. 3.

Referring now to FIGS. 6 and 7, the tool holder is shown therein and indicated generally at 110. Tool holder 110 has a forward portion 112 and a rearwardly extending, tubular shank 114. A rearwardly facing abutment surface 116 is formed at the junction between the tubular shank 114 and forward portion 112.

The forward portion 112 is formed with a tool receiving pocket 118 adapted to receive a conventional cutting insert 122. (See FIG. 1) The cutting insert 122 includes two converging cutting edges 122a and 122b which meet to form a rounded cutting tip 123. The top of the cutting insert 122 is engaged by the clamping member 126 to secure the insert 126 in its seat 118. The clamping member 126 is secured to the forward portion 112 by a clamp screw 128 which threads into a corresponding hole (not shown) n the top of the forward portion 112.

When using the present invention to form a helix, it is important that the tip 123 of the cutting insert 122 lie on the centerline of the tool holder. Therefore, when the tool holder is rotated about its own axis, the radial position of the tip 123 will not be changed. Instead, only the angular orientation of the insert 122 is changed.

The shank 114 is an integral part of the tool holder 110, and is preferably machined from a single piece of steel. The shank 114 has a frusto-conical shape and is perforated at two circumferentially spaced locations by apertures 120. The tubular shank 114 also includes two diametrically opposed key slots 130 and 132. When the tool holder 110 is inserted into the sleeve 40, one of the key slots 130 engage key 134 to hold the tool holder 110 non-rotatable with respect to the sleeve 40. The opposite key slot 132 slides over the shank of the actuating member 80. When the tool holder is secured in the sleeve 40, the tip of the cutting insert 122 should lie on the longitudinal axis of the tool assembly.

In most prior art tools, the tool holder 10, and thus the cutting insert 122, has a fixed angular orientation with respect to the tool block 12. The fixed angular orientation of the cutting tool has caused some difficulties. For instance, when cutting worm gears, the cutting inserts have to be particularly designed to provide clearance on the leading edge of the insert so that it can clear the helix being formed. The amount of clearance needed will depend upon the pitch of the helix. Thus, it is normal to provide a separate cutting insert for each helix of a different pitch.

The present invention overcomes this and other drawbacks with the prior art by providing mean for rotating the tool holder about longitudinal axis x-x to change the angular orientation of the cutting insert.

Figure 2:
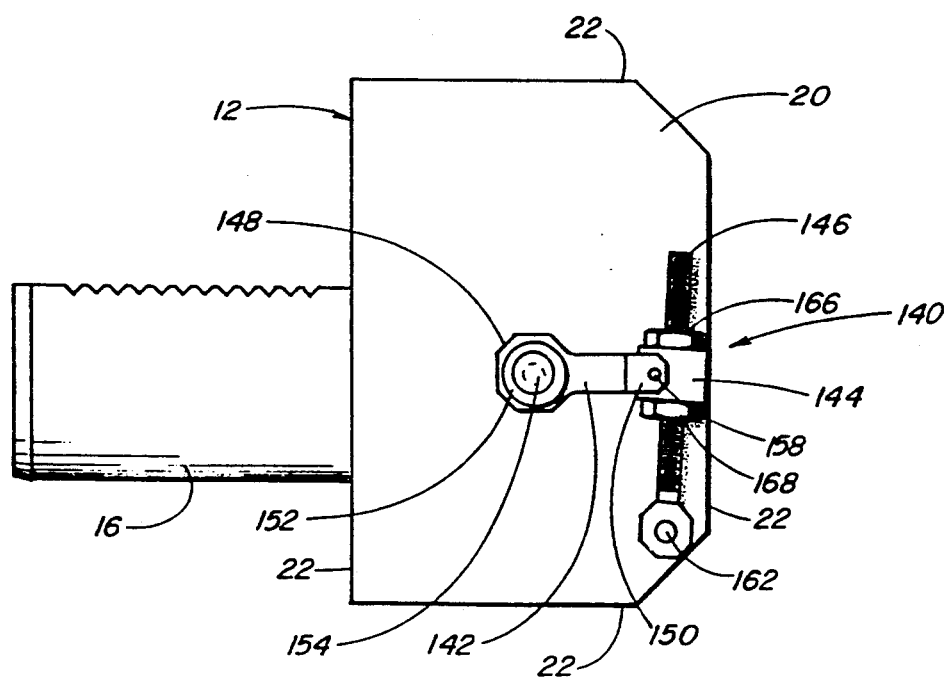
FIG. 2 is a bottom view of the tool holder assembly of the present invention.

Referring now to FIG. 2, the adjustment mechanism is shown and indicated generally at 140. The adjustment mechanism includes an adjustment arm 142, an adjustment block 144, and an adjustment rod 146. The adjustment arm includes a sleeve portion 148 and yoke portion 150. The sleeve portion 148 is n the form of a hex which is adapted to engage with the end of the shaft 48.

The adjustment arm 142 is secured to shaft 148 by means of a washer 152 and bolt 154 which threads into the end of shaft 48. The yoke portion 150 of the adjustment arm 142 includes spaced apart arms 156 which extend on opposite sides of the adjustment block 144. A dowel pin 158 having ends which are firmly embedded in the yoke arms 156 extends through an opening (not shown) in the adjustment block 144. The dowel pin 158 is loosely held in the opening so that the adjustment arm 142 may rotate about the axis of the dowel pin 158.

The adjustment rod 146 is pivotally secured at one end to the tool block 12 by dowel pin 162. The adjustment rod 146 extends through a transverse opening 164 in the adjustment block. Positioning nuts 166 and 168 are threaded onto the adjustment rod 146 and are disposed on opposite sides of the adjustment block 144. By tightening positioning nuts 166 and 168 against the adjustment block 144, the adjustment block 144 can be held in a fixed position on the rod 146.

It will be readily apparent from the foregoing description that the adjustment block 144 can be moved along adjustment rod 146 by repositioning nuts 166 and 168. Further, when the adjustment block 144 is moved the adjustment arm 142 will rotate about the longitudinal axis x-x. Since the adjustment arm 142 is fixed to shaft 48, the entire sleeve 40 containing tool holder 110 will rotate. Therefore, the angular orientation of the tool holder 110 can be adjusted by moving adjustment block 144 linearly along adjustment rod 146.

To adjust the angular orientation of the tool holder, one of the positioning nuts 166 s threaded away from the adjustment block 144. The opposite positioning nut can then be threaded towards the adjustment block until the adjustment block 144 is again abutted against the first positioning nut. Both positioning nuts are then tightened against the adjustment block 144 to fix the block at its new position.

By providing means to enable the tool holder to be rotated about its own longitudinal axis, a tool having a fixed cutting edge angle can be used to cut a variety different parts. Side clearance for the leading edge of the tool is obtained simply by rotating the tool about its longitudinal axis. Further, as a result of the present invention, cutting inserts can be designed with greater support for the leading cutting edge than could previously be obtained used prior art designs. Also, by rotating the cutting insert, tool pressures can be distributed more evenly between the leading cutting edge and trailing cutting edge.

Since the angular orientation of the tool can be changed, the present invention eliminates the need to keep a plurality of separate tools for cutting different parts. In other words, using the present invention, a single cutting insert can be used to cut a plurality of different parts where in the past, separate inserts were required.

The present invention may be useful for machining operations other than cutting helixes. For instance, in full grooving operations, it is useful to adjust the angular orientation of the cutting insert without changing the radial position of the cutting tip. The present invention as previously described, provides this capability.

Also, the present invention may be useful in profiling operations to provide the capability to make very small adjustments in the height of the cutting insert. To achieve this capability, it is necessary to offset the cutting insert 122 with respect to the axis of the tool holder. When the tool holder is rotated in very small increments, small changes in the height of the insert can be achieved only inconsequential changes in the radial position of the insert.

The present invention may, of course, carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A tool holder assembly having an adjustment mechanism for adjusting the angular orientation of a cutting insert with respect to the longitudinal axis of a tool holder comprising:
    a) a tool block;
    b) a mounting member mounted to the tool block and rotatable about the longitudinal axis of the tool holder;
    c) a tool holder formed with a pocket adapted to receive the cutting insert;
    d) means for releasably securing the tool holder to the mounting member so that the tool holder is held nonrotatable with respect to the mounting member; and
    e) means for rotating the mounting member about the tool holder longitudinal axis in any rotational increment within a range to effect rotation of the tool holder within a plane perpendicular to the longitudinal axis.

2. The tool holder assembly according to claim 1 wherein the mounting member comprises a sleeve including a wall structure defining a tool receiving pocket and wherein the tool holder includes a shank insertable into the tool receiving pocket of the mounting sleeve.

3. The tool holder assembly according to claim 2 wherein the tool block includes a bore adapted to receive the sleeve, the bore and the sleeve being so sized and shaped that the sleeve is rotatable within the bore.

4. The tool holder assembly according to claim 3 wherein the mounting member includes a shaft which protrudes from the tool block and which is coaxial with the longitudinal axis of the tool holder.

5. The tool holder assembly according to claim 4 wherein the adjustment mechanism includes an adjustment block; a pivot arm fixedly secured at one end to the protruding portion of the shaft, and pivotally secured at its opposite end to the adjustment block; and means for reciprocally moving the adjustment block.

6. The tool holder assembly according to claim 5 wherein the adjustment mechanism includes an adjustment rod pivotally secured at one end to the tool block, the adjustment block being moveably mounted on the adjustment rod.

7. The tool holder assembly according to claim 6 wherein the means for moving the adjustment block includes a pair of positioning nuts threaded onto the adjustment rod and disposed on opposite sides of the adjustment block.

8. A tool holder assembly having an adjustment mechanism for adjusting the angular orientation of a cutting insert about the longitudinal axis of a tool holder, comprising:
    a) a tool block having a front face and a rear face;
    b) a cylindrical bore formed in the tool block and extending from the front face to the rear face;

c) a tool mounting sleeve rotatably mounted in the cylindrical bore of the tool block, wherein the sleeve defines a tool receiving pocket, and includes a shaft which projects beyond the rear face of the tool block;

d) a tool holder including a forward portion formed with a pocket adapted to receive and hold a cutting insert, and a shank portion insertable into the tool receiving cavity of the mounting sleeve;

e) means for releasably securing the tool holder in the mounting sleeve so that the tool holder is nonrotatable with respect to the mounting sleeve; and f) means for rotating the mounting sleeve about the tool holder longitudinal axis in any rotational increment within a range to effect adjustments in the angular orientation of the tool holder within a plane perpendicular to the longitudinal axis.

9. The tool holder assembly according to claim 8 wherein the adjustment mechanism includes an adjustment block; a pivot arm fixedly secured at one end to the protruding portion of the shaft, and pivotally secured at its opposite end to the adjustment block; and means for reciprocally moving the adjustment block.

10. The tool holder assembly according to claim 9 wherein the adjustment mechanism includes an adjustment rod pivotally secured at one end to the tool block, and wherein the adjustment block is movable linearly along the adjustment rod.

11. The tool holder assembly according to claim 10 wherein the means for linearly moving the adjustment block includes a pair of positioning nuts threaded onto the adjustment rod and disposed on opposite sides of the adjustment block.

12. A method for adjusting the angular orientation of a cutting insert comprising:

a) mounting the cutting insert to a tool holder so that the tip of the cutting insert lies on the centerline of the tool holder;

b) mounting the tool holder within a sleeve member so that the tool holder is non-rotatable with respect to the sleeve member;

c) mounting the sleeve member to a support member so that the sleeve member is rotatable about the centerline of the tool holder;

d) rotating the sleeve member about the tool holder longitudinal axis in any rotational increment within a range to effect changes in the angular orientation of the tool holder within a plane perpendicular to the longitudinal axis without changing the radial position of the insert; and e) locking the sleeve member to prevent further rotation once the desired angular orientation is achieved.

13. The method according to claim 12 wherein the step of rotating the sleeve member includes: fixedly securing one end of an arm to the sleeve; pivotally securing the opposite end of the pivot arm to an adjustment block; and reciprocating the adjustment block to effect rotation of the sleeve.

14. The method according to claim 13 wherein the step of rotating the sleeve member further includes: mounting the adjustment block on an adjustment rod so that the block is movable along the length of the rod; fixing one end of the adjustment rod to the support member; wherein the step of reciprocating the adjustment block includes moving the adjustment block along the length of the adjustment rod.

15. The method according to claim 14 wherein the step of rotating the sleeve member further includes threading a pair of positioning nuts onto the adjustment rod so that the positioning nuts are disposed on opposite sides of the adjustment block, and turning the positioning nuts to move the adjustment blocks along the length of the adjustment rod.

* * * * *